United States Patent [19]

Winkley

[11] 3,903,244

[45] Sept. 2, 1975

[54] STABILIZED HYDROGEN PEROXIDE
[75] Inventor: Donald Charles Winkley, Trenton, N.J.
[73] Assignee: FMC Corporation, New York, N.Y.
[22] Filed: Feb. 2, 1973
[21] Appl. No.: 328,984

[52] U.S. Cl.................................. 423/272; 423/584
[51] Int. Cl............................................. C01b 15/02
[58] Field of Search ........... 423/272, 584, 585, 586, 423/587, 588, 589, 590, 591, 273

[56] References Cited
UNITED STATES PATENTS
876,179  1/1908  Heinrici .............................. 423/272
992,265  5/1911  Schlaugk............................. 423/272
3,383,174  5/1968  Carnine et al. ...................... 423/273
3,701,825  10/1971  Radimer et al. ..................... 423/273

Primary Examiner—Oscar R. Vertiz
Assistant Examiner—Wayne A. Langel

[57] ABSTRACT

A hydrogen peroxide concentrate is described containing up to 50% hydrogen peroxide, 1 to 3% of a soluble amino(methyl phosphonic acid) or a salt thereof, and 0.05 to 0.5% of phenol; the concentrate is useful in the preparation of highly acid metal pickling baths.

2 Claims, No Drawings

STABILIZED HYDROGEN PEROXIDE

This invention relates to the preparation of concentrated hydrogen peroxide solutions containing substantial amounts of amino(methyl phosphonic acid) which are stable under commercial storage conditions.

In the copending application of Donald C. Winkley entitled "Stabilization of Iron-Containing Acidic Hydrogen Peroxide Solutions", filed on Feb. 2, 1973, Ser. No. 328,987, there is described a method of stabilizing highly acid solutions of hydrogen peroxide (pH below 2) against short-term decomposition induced by the presence of ferric iron ions, in the range of 30 to 30,000 ppm. The method involves the use of amino(methyl phosphonic)acids in amounts which yield, in solution, three phosphonic acid groups for each ferric ion present in the solution. Surprisingly, these phosphonic acids, which have been widely used as sequestering agents, precipitate at least the bulk of the iron from such solutions, so that decomposition of peroxide is sharply reduced.

In the practice of that process, it is desirable to add to the acid solution a known inhibitor for the catalysis of hydrogen peroxide decomposition by non-ferrous heavy metals such as copper. Phenol is a preferred additive for this purpose.

In attempting to make concentrates of hydrogen peroxide containing these inhibitors, which could be used to give the proper proportions of inhibitors to hydrogen peroxide, stability difficulties were encountered. Quite unexpectedly, the amino(methyl phosphonic acid)s, which act to stabilize hydrogen peroxide at very low concentrations, below 0.1%, actually produce marked instability in hydrogen peroxide solutions when used in the desirable concentrations of 3 to 5% needed with commercial 70% hydrogen peroxide. Moreover, in such solutions, with or without any amino(methyl phosphonic acid), the small amounts of phenol desirable for this process disappear entirely within a few days, apparently due to reaction with the peroxide.

I have discovered that commercially acceptable hydrogen peroxide solutions useful in preparing acid solutions resistant to iron can be made by combining 20% to 50% hydrogen peroxide with about 1 to 3% of amino(methyl phosphonic acid) or soluble salt thereof and 0.05 to 0.5% of phenol. Within these ranges, the solutions are stable over extended periods of time, and still yield acceptable additives for the preparation of highly acid peroxide baths resistant to iron.

In working to control the rapid decomposing effect of iron in highly acid aqueous solutions of hydrogen peroxide (pH below 2) which normally contain 30 to 30,000 ppm of iron, it was found that amino(methyl phosphonic acid)s which were soluble in the strongly acid hydrogen peroxide solutions or their soluble salts, precipitated ferric iron from these solutions, rather than chelating the iron; if three phosphonic acid groups were used for each ferric ion, the bulk of the iron was precipitated, and the remainder in solution was much less active in catalyzing the peroxide decomposition. We have no explanation for the phenomenon, but the addition does control the decomposition of the peroxide under these conditions. The amino(methyl phosphonic acid)s may be used as such, or in the form of their soluble salts; the alkali metal, ammonium, substituted ammonium, magnesium and calcium salts are generally as soluble as or more soluble than the phosphonic acids themselves.

The simplest compound found effective is amino trimethyl phosphonic acid, $N(CH_2PO_3H)_3$. It is readily soluble in sulfuric acid, as are its sodium, potassium, ammonium and ammonium salts. The replacement of one or two of the methyl phosphonic acid groups by organic radicals renders the material and its salts less soluble, but the substituted compounds are useful as long as they remain soluble. Ethyl amino bis(methyl phosphonic acid) and its salts are soluble; the sodium salt of dodecylamino bis(methyl phosphonic acid) is water-soluble and a solution is readily prepared, but largely precipitates when added to sulfuric acid solutions; however, enough remains in solution to be effective in controlling relatively small amounts of iron. In general, the total number of carbons in the substituents on the nitrogen should not exceed about 12 if solubility is to be maintained.

The amino(methyl phosphonic acid) used can be more complex. For example, various polymethylene diamine tetra(methyl phosphonic acid)s and their salts have been used, of the generic formula

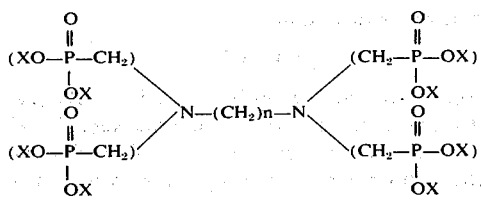

where $n = 2$ to 6 and where X groups are hydrogen, ammonium, substituted ammonium, alkali metal, magnesium or calcium.

It was also found that auxiliary agents such as phenol, heretofore used to control the decomposition of peroxide induced by non-ferric heavy metals such as copper, could be added to the composition to give improved stability. Generally, a minor fraction of a percent of phenol is sufficient.

In preparing concentrates of commercial hydrogen peroxide for use in that process, it was found, surprisingly, that standard 70% hydrogen peroxide, blended with the 3 to 5% of amino(methyl phosphonic acid) needed to give the correct ratios in the acid pickling baths, was not sufficiently storage stable to be shipped. Moreover, any phenol added to the solution disappeared within a few days, apparently due to reaction with the hydrogen peroxide.

We have discovered that stabilized peroxide concentrates can be made by using 20% to 50% aqueous hydrogen peroxide containing about 1 to 3% of amino(methyl phosphonic acid) or a soluble salt thereof, and 0.05 to 0.5% of phenol. Within these ranges, acceptable commercial storage stability (above 95% stability for 24 hours at 100°C) of the concentrates can be obtained along with the proper proportions of peroxide to inhibitor for use when mixing the concentrate with acid to make up highly acid, stable solutions useful in metal pickling.

In general, lower concentrations of stabilizers are used with the less concentrated peroxide solutions. Optimum results are obtained with commercial 35% hydrogen peroxide. The stabilized peroxide concentrates are normally adjusted to a pH of from 2 to 4 for optimum storage stability; however, concentrates need only have an acid pH (pH 6 or below) to be effectively stabilized.

Typical examples of the invention are given as follows, by way of illustration only:

EXAMPLE 1

A 35% hydrogen peroxide formulation was prepared which contained 1 weight percent of amino(trimethyl phosphonic acid) and 0.1 weight percent of phenol. The final pH of the hydrogen peroxide was adjusted to 2.2, using NaOH. The resulting formulation had a 24-hour 100°C stability of 98.0%. This stability was well above the 95% minimum considered safe for commercial handling and shipment.

EXAMPLE 2

Another hydrogen peroxide formulation was prepared identical to that of Example 1, only containing 0.5 weight percent of ethylenediamine tetra(methyl phosphonic acid) in addition to the other ingredients listed. The ethylenediamine tetra(methyl phosphonic acid) was added as a solution of its sodium salt. The final pH was adjusted to 2.2 with NaOH. The formulation had a 24-hour 100°C stability of 97.3%, rendering it completely satisfactory.

EXAMPLE 3

A large commercial quantity of a 35% hydrogen peroxide formulation was prepared containing 2% amino(trimethyl phosphonic acid), 0.5% ethylenediamine tetra(methyl phosphonic acid) and 0.2% phenol. The initial phenol level was measured analytically as 2,100 ppm. The formulation was stored in a 55-gallon polyethylene-lined drum for 6 months at room temperature. After this storage period, the phenol level was measured by two independent analytical techniques as 1,550 ppm and 1,515 ppm and the peroxide was essentially intact. Thus the auxiliary stabilizer selected has a sufficient half life in the peroxide formulation to allow it to be prepared and stored commercially.

Obviously, the examples can be multiplied without departing from the scope of the invention as defined in the claims.

In the specification and claims, all percentages are by weight. The term amino (methyl phosphonic acid) or salt thereof, as used throughout the specification and claims, refers to compounds where an N is attached to one or more ($CH_2$—$PO_3X$) groups, wherein X is hydrogen or a cation that does not interfere with the function of the compound as a stabilizer. Typical examples of useful cations are ammonium, substituted ammonium, or an alkali metal. Such compounds are more generally referred to in the literature as amino (methylene phosphonic acid)s or salts thereof. See, for example, U.S. Patents Nos. 3,383,174 and 3,701,825.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. An aqueous solution containing 20 to 50% hydrogen peroxide, 1 to 3% of a soluble amino(methyl phosphonic acid) in free form or in the form of a soluble salt, and 0.05 to 0.5% phenol.

2. The solution of claim 1, in which the peroxide concentration is 35%, the phosphonic acid is a mixture of 2.0% of amino(trimethyl phosphonic acid) and 0.5% of ethylenediamine tetra(methyl phosphonic acid) and the phenol is present in 0.2% concentration.

* * * * *